(12) United States Patent
Herbst

(10) Patent No.: US 11,315,267 B2
(45) Date of Patent: Apr. 26, 2022

(54) METHOD FOR PROCESSING SCAN DATA

(71) Applicant: LEICA GEOSYSTEMS AG, Heerbrugg (CH)

(72) Inventor: Christoph Herbst, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 59 days.

(21) Appl. No.: 15/796,677

(22) Filed: Oct. 27, 2017

(65) Prior Publication Data
US 2018/0122091 A1    May 3, 2018

(30) Foreign Application Priority Data
Oct. 27, 2016  (EP) .................................. 16196050

(51) Int. Cl.
*G06T 7/521* (2017.01)
*G06T 5/00* (2006.01)
(Continued)

(52) U.S. Cl.
CPC ............ *G06T 7/521* (2017.01); *G01C 15/002* (2013.01); *G01S 7/4808* (2013.01); *G01S 7/51* (2013.01); *G01S 17/42* (2013.01); *G06T 5/002* (2013.01); *G06T 9/00* (2013.01); *G06T 15/00* (2013.01); *G09G 3/001* (2013.01); *G01B 9/02089* (2013.01); *G01B 11/2441* (2013.01);
(Continued)

(58) Field of Classification Search
None
See application file for complete search history.

(56) References Cited

U.S. PATENT DOCUMENTS 5,847,714 A * 12/1998 Naqvi .................. G06T 3/4007
                                                                       345/668
5,852,410 A * 12/1998 Berger ................... G01S 7/497
                                                                       340/903

(Continued)

FOREIGN PATENT DOCUMENTS

AU         2005202928 A1     7/2005
CN           101189643 A     5/2008
(Continued)

OTHER PUBLICATIONS

K. H. Lee, H. Woo, T. Suk, "Point Data Reduction Using 3D Grids", 2001, Springer, The International Journal of Advanced Manufacturing Technology, vol. 18, pp. 201-210.*
(Continued)

*Primary Examiner* — Robert Bader
(74) *Attorney, Agent, or Firm* — Maschoff Brennan

(57) ABSTRACT

A method for processing scan data which are recorded by a measuring device with a scan functionality, wherein a reduced scan data record is created from a recorded scan data record with a first scan data density by selecting individual scan data points. Here, the selection represents an adaptation to a reduced scan data density, which is less than the first scan data density of the recorded scan data record. The reduced scan data density depends on a predetermined display resolution for displaying scan data. The reduced scan data record is transmitted to an external data processing device and displayed by the latter by means of a display, depending on the predetermined display resolution.

17 Claims, 5 Drawing Sheets

(51) Int. Cl.

| | | |
|---|---|---|
| G06T 15/00 | (2011.01) | |
| G09G 3/00 | (2006.01) | |
| G01B 9/02 | (2022.01) | |
| G01C 15/00 | (2006.01) | |
| G06T 9/00 | (2006.01) | |
| G01S 7/51 | (2006.01) | |
| G01S 7/48 | (2006.01) | |
| G01S 17/42 | (2006.01) | |
| G01B 11/24 | (2006.01) | |
| G01S 17/08 | (2006.01) | |
| G01S 17/89 | (2020.01) | |

(52) U.S. Cl.
CPC ............... *G01S 17/08* (2013.01); *G01S 17/89* (2013.01); *G06T 2207/10028* (2013.01); *G09G 2340/04* (2013.01)

(56) References Cited

U.S. PATENT DOCUMENTS

| | | | |
|---|---|---|---|
| 2005/0111009 A1* | 5/2005 | Keightley | G01B 11/25 356/602 |
| 2005/0203930 A1* | 9/2005 | Bukowski | G06F 16/29 |
| 2008/0088623 A1* | 4/2008 | Bukowski | G06T 17/00 345/423 |
| 2010/0045678 A1* | 2/2010 | Reid | G06T 13/00 345/427 |
| 2012/0033069 A1* | 2/2012 | Becker | G01S 17/89 348/135 |
| 2014/0078519 A1 | 3/2014 | Steffey et al. | |
| 2014/0218354 A1* | 8/2014 | Park | G06T 19/00 345/419 |
| 2015/0178594 A1* | 6/2015 | Curington | G06K 9/00201 382/154 |
| 2015/0379778 A1 | 12/2015 | Finn et al. | |
| 2017/0301132 A1* | 10/2017 | Dalton | G06T 7/521 |

FOREIGN PATENT DOCUMENTS

| | | |
|---|---|---|
| CN | 201749187 U | 2/2011 |
| CN | 102893174 A | 1/2013 |
| CN | 103873751 A | 6/2014 |
| CN | 104079810 A | 10/2014 |
| CN | 104408055 A1 | 3/2015 |
| CN | 104620129 A | 5/2015 |
| CN | 104700451 A | 6/2015 |
| DE | 10 2013 102 554 A1 | 9/2014 |
| EP | 2 947 630 A1 | 11/2015 |
| EP | 3 056 923 A1 | 8/2016 |
| JP | H0511209 A | 1/1993 |
| WO | 2011/141100 A1 | 11/2011 |

OTHER PUBLICATIONS

Dr. Ralph R. Martin, Dr. Tamas Varady, "RECCAD, Deliverable Document 1 COPERNICUS project, No. 1068 Report on data acquisition, preprocessing and other tasks in 1995/1996", Jan. 1996, Computer and Automation Institute of Hungarian Academy of Science.*
Peter Allen, Ioannis Stamos, Atanas Gueorguiev, Ethan Gold, Paul Blaer, "AVENUE: Automated Site Modeling in Urban Environments", Jun. 2001, IEEE, Proceedings Third International Conference on 3-D Digital Imaging and Modeling, pp. 357-363.*
Sushil Bhakar, Liang Luo, S.P. Mudur, "View Dependent Stochastic Sampling for Efficient Rendering of Point Sampled Surfaces", 2004, UNION Agency, Journal of WSCG. 2004, vol. 12, No. 1-3, p. 49-56.*
J.P. Grossman, "Point Sample Rendering", Aug. 1998, Master's Thesis, MIT.*
Hamidreza Houshiar, Dorit Borrmann, Jan Elseberg, Andreas Nuchter, "Panorama Based Point Cloud Reduction and Registration", Nov. 29, 2013, IEEE, 16th International Conference on Advanced Robotics (ICAR).*
C. Nothegger, P. Dorninger, "Automated Modeling of Surface Detail from Point Clouds of Historical Objects", Oct. 6, 2007, CIPA, 21st CIPA Symposium, International Archives of the Photogrammetry, Remote Sensing and Spatial Information Sciences 36 (Part 5/C53), pp. 538-543.*
David Barber, Jon Mills, Paul Bryan, "Laser Scanning and Photogrammetry: 21st Century Metrology", Sep. 21, 2001, CIPA 2001 International Symposium, University of Postdam, Germany.*
Richard Szeliski, Heung-Yeung Shum, "Creating Full View Panoramic Image Mosaics and Environment Maps", Aug. 1997, ACM, SIGGRAPH '97: Proceedings of the 24th annual conference on Computer graphics and interactive techniques, pp. 251-258.*
Extended European Search Report dated May 18, 2017 as received in Application No. 16196050.5.

\* cited by examiner

METHOD FOR PROCESSING SCAN DATA

FIELD OF THE INVENTION

The invention relates to a method for processing scan data. More particularly, the invention relates to method for processing scan data and to a measuring system with a scan functionality.

BACKGROUND 3D scanning is a very effective technology for producing millions of individual measurement data points, in particular 3D coordinates, within minutes or seconds. Typical measurement problems are the recording of objects or the surfaces thereof, such as industrial installations, house facades or historic buildings, but also of accident locations and crime scenes. By way of example, measuring devices with a scan functionality are total stations and laser scanners such as the Leica P20 or Leica Multi Station 50, which are used to measure or create 3D coordinates of surfaces. To this end, they must be able to guide the measurement beam—usually a laser beam—of a distance measuring apparatus over a surface and, using this, simultaneously capture direction and distance of the respective measurement point successively in different measurement directions at a given scanning or measuring rate. Here, direction and distance are related to a measurement reference point such as e.g. the location or zero point of the measuring device; i.e., expressed differently, they lie in a common reference or coordinate system such that hence the individual measurement directions and, as a result thereof, the individual measurement data points are linked to one another by the common measurement reference point. As a consequence, a so-called 3D point cloud can subsequently be generated from the multiplicity of scanned points, in particular by means of an external data processing installation, from the distance measurement value and the measurement direction correlated therewith for each point.

Thus, in terms of the basic design thereof, such stationary scanners are embodied to capture a distance to an object point as a measurement point using a distance measuring device that is usually electro-optical and based on lasers. The distance measuring device can be embodied, for example, according to the principles of the time-of-flight (TOF), phase, wave-form-digitizer (WFD) or interferometric measurement. For fast and accurate scanners, a short measurement time with, at the same time, high measurement accuracy is required in particular, for example a distance accuracy in the mm range or below in the case of measurement times of the individual points in the range of sub-microseconds to milliseconds. The measurement range in this case reaches from a few centimeters up to several kilometers.

A likewise present measurement direction deflection unit is embodied here in such a way that the measurement beam of the distance measuring device is deflected in at least two independent spatial directions, i.e. the measurement direction is continuously modified, as a result of which a (part) spherical spatial measurement or scan region can be recorded. The scan region is often 360° in the horizontal direction in this case, i.e. a complete circle, and e.g. 180° in the vertical direction such that at least one hemisphere is covered. The deflection unit can be realized in the form of a moving mirror or, alternatively, by other elements that are suitable for the controlled angular deflection of optical radiation as well, such as e.g. rotatable prisms, movable light guides, deformable optical components, etc. The measurement is usually carried out by determining distance and angles, i.e. in spherical coordinates, which can also be transformed into Cartesian coordinates for representation and further processing purposes.

The scan resolution with which the scan region is covered in this case emerges from the number of individual measurement data points or, more accurately, the number of measured points per spatial region or sphere surface element. The scan resolution determines what details can still be recognized, but also the duration of the scan process and the amount of data accruing in the process. Measurement projects with modern high-speed scanners produce 3D point clouds with a cardinality of e.g. several hundred million or several billion object points and more. That is to say, an exceedingly large amount of data accrues as a result of such scans, which is still enlarged if, as is usually the case, further data, such as e.g. color information items, intensity data or noise dimensions ascertained by an additional camera, are captured as part of the scan data record in addition to the 3D coordinates (i.e. distance and direction information). Storing, sending and processing the enormous amount of data accompanying this presents a great challenge to hardware and software, and it is time intensive. Thus, in view of the amount of data, e.g. the transfer of the scan data to an external device such as a tablet or smartphone requires a long period of time, particularly in the case of a wireless transmission.

Such a transfer of the scan data to an external device is advantageous in many ways and known from the prior art. Thus, DE 10 2013 102 554 A1 discloses a laser scanner which has a radio link to a network and which can transfer scan data to the network by means of this radio link, said scan data then being stored e.g. in a cloud. The radio link is of a fast, broadband and long-range type, preferably pursuant to the LTE standard. A disadvantage here is that the transfer of a complete scan data record is time intensive, even in the case of such a radio link. Moreover, such a fast and broadband mobile radio link is by no means available everywhere yet, and so the data transfer often still takes significantly longer. Long data transmission times and, as a result thereof, a high battery load are disadvantageous, also in view of the restricted battery capacity of a laser scanner or of an external device such as e.g. a smartphone.

EP 3 056 923 A1 likewise discloses a laser scanner with a radio link, and a method in which the scan data of several scans of the same measurement surroundings are transferred to an external computer by means of this radio link. According to the disclosure of EP 3 056 923 A1, a (pre-)registration of the scans in relation to one another is undertaken by the external computer with the aid of location and orientation data that is determined by means of a GNSS unit of the laser scanner. The data transfer is carried out here e.g. by means of radio, Bluetooth, a Wi-Fi connection or mobile radio. Here too, the data transfer is disadvantageously very time intensive or, disadvantageously, a very fast data connection is required to keep the transfer time within tolerable limits in view of the enormous amount of data—particularly in view of the fact that not only the data record of one scan but the data records of a plurality of scans are to be transferred. Thus, EP 3 056 923 A1 itself specifies that a very fast Wi-Fi connection is advantageous.

SUMMARY

It is therefore an object of some embodiments of the present invention to provide an improved method for further processing of scan data in a timely manner.

A further object lies in the provision of an improved method for transferring scan data from a laser scanner that is still in the field to an external device.

A further object lies in the provision of an improved method for networking one or more laser scanners.

These objects are achieved by the implementation of the characterizing features of the independent claims. Features which develop the invention in an alternative or advantageous manner can be gathered from the dependent patent claims and from the description, including the descriptions of the figures. All presented embodiments of the invention or embodiments of the invention that are disclosed in a different way within this document are combinable with one another as long as nothing else is expressly determined.

Some embodiments of the invention relates to a method for processing scan data. Within the scope of the method, there is recording of a first, recorded scan data record using a measuring device with a scan functionality over a defined object surface scan region. The measuring device is preferably stationary and optionally embodied as a laser scanner or total station. The scan region optionally encompasses 360° in the horizontal direction and approximately 270° in the vertical direction. The recorded scan data record comprises a first number of individual scan data points with a first scan data density. The individual scan data points are respectively related to a point on an object surface. That is to say, the higher the point density with which a specific object surface is scanned, the higher the number of individual scan data points, and hence the scan data density, as well.

Further, the method according to some embodiments the invention comprises a creation of a reduced scan data record with a second, reduced number of individual scan data points. The creation is carried out by virtue of an (onboard) control and evaluation unit of the measuring device making a selection from the first number of individual scan data points of the recorded scan data record. Here, the selection is carried out as an adaptation to a predetermined second, reduced scan data density, which is lower than the first scan data density. Here, according to the invention, the reduced scan data density is dependent on a predetermined display resolution for the visual display of scan data. The resolution with which a visual representation of the scan data takes place or is intended to take place thus, according to the invention, predetermines the reduced scan data density which, in turn, serves as a benchmark for the reduction of the recorded scan data record such that thus, at least indirectly, the scope of the reduced scan data record is predetermined by the predetermined display resolution. To this end, the reduced scan data density or else the first, recorded scan data density need not be present or determined as explicit values but can only be provided implicitly, e.g. by the number of recorded individual scan data points or the predetermined display resolution. Here, selection of individual scan data points should also be understood to mean that the respective individual scan data points to be adopted are not completely adopted in the reduced scan data record, instead, only data parts thereof are; by way of example, this may be the case if the individual scan data points of the recorded scan data record comprise even further scan data (e.g. intensity values or color information items) in addition to the 3D coordinates (or the distance and direction values) and these further scan data should not be presented. Then, e.g. only the 3D coordinates, or the distance and direction values, are adopted as individual scan data points, as a result of which data volume is saved in comparison with a complete individual scan data point adoption. Optionally, the reduced number of individual scan data points equals the number of pixels of the predetermined display resolution and/or it is at most half, e.g. at most a quarter or a tenth, of the first number of individual scan data points.

Further, the reduced scan data record is transmitted from the measuring device to an external data processing device within the scope of the method. The external data processing device is e.g. a tablet, field controller or smartphone, or a desktop PC. Transmission is preferably effectuated wirelessly, e.g. by Wi-Fi, Bluetooth or radio, in particular if the data processing device is not situated in the immediate vicinity of the measuring device.

Furthermore, the reduced scan data record, or parts thereof, are visually displayed with the predetermined display resolution or a display resolution that is derived therefrom, for example half the resolution, on a display of the external data processing device. Thus, by the creation of a reduced scan data record, which creation is matched to the display resolution, it is precisely those individual scan data points that are transmitted to the external device which are required for the visual representation with the desired display resolution. A data volume that is unnecessary in view of the visualization is saved in a targeted manner; this is advantageous in view of the data transfer and also a data visualization. Here, according to the invention, not only is there transmission of pure representation data, which only represent an image, by the transmission of a record of scan data, but measurement data (e.g. point coordinates or distance measurement values, intensity, color), which e.g. allow an evaluation and/or processing of scan data or else a production of a 3D point cloud, are present at the external data processing device. Many further processing or evaluation steps of the recorded scan data by no means require the entire richness or density of the individual scan data points. Often, a type of thinned or approximate scan data record, as represented by the reduced scan data record, is completely sufficient—at least for preliminary or approximate processing or evaluation of the scan data. Moreover, the computational outlay is reduced in the process since it is no longer necessary to take into account all recorded individual scan data points during the representation and/or evaluation or processing.

As a particularly advantageous option, there is a creation of the reduced scan data record and the transmission thereof in a timely manner in relation to the recording thereof, preferably immediately after completion of the recording of the recorded scan data record or, in real time, already during the recording for already recorded scan data, and so an (at least approximate) visualizable result of the scan is available at the external data processing device practically without delay.

By way of example, as an option, there is a timely evaluation of the scan data record on the basis of the transmitted reduced scan data record and by means of the external data processing device, there preferably is a check for completeness and/or errors, with the recorded or reduced scan data record being complemented and/or corrected in a timely manner by further recording of individual scan data points with the measuring device if incompleteness and/or an error is present. Alternatively, or additionally, regions of interest are ascertained within the scope of the evaluation and the recorded or reduced scan data record is complemented in a timely manner by further recording, using the measuring device, of individual scan data points of object surfaces of the region of interest with a third, increased scan data density. Thus, the method according to the invention advantageously facilitates the quick and immediate repair of defects in a scan and/or the improvement or optimization thereof by targeted post-scanning.

In a development of the method according to some embodiments the invention, there is processing of the transmitted reduced scan data record by means of the external data processing device such that a processed scan data record emerges. Optionally, there is (virtually) simultaneous and/or location-distributed processing, for example in part at the measuring location, in part in an office, on a plurality of external data processing devices, for the purposes of which the reduced scan data record was previously transmitted to a plurality of such devices. Preferably, there is an insertion of metadata within the scope of the processing, wherein the metadata are e.g. texts, images, voice memos, CAD data, point coordinates or a variable derived from at least two individual measurement data points, for example a length, area or a volume. There is a (preferably wireless) return transmission of the processed scan data record, either completely or else only in terms of its processed, e.g. modified or complemented, parts, to the measuring device and on the basis thereof the recorded or reduced scan data record that is kept available in a memory of the measuring device is complemented or adapted. As an option, the return-transmitted processed scan data record or the return-transmitted parts thereof are taken into account when representing scan data by a display unit of the measuring device, e.g. by virtue of inserted metadata being displayed together with the individual scan data points, i.e., for example, by virtue of texts or images automatically popping-up after reception in a visualization of the scan on a display of the laser scanner.

In a further development, there is a transmission of at least two different scan data records with overlapping scan regions, i.e. of at least two scan data records which at least in part image different regions of the scan surroundings. Further, there is linking of the scan data records to one another, preferably an approximate alignment of the scan data records, by means of the data processing device, and so the point coordinates thereof are written in a common coordinate system. Optionally, there is manual linking on the basis of the visual display, for example by marking display points (common points in the display of both the scan data records) and/or display regions (corresponding regions of both scan data records) on a presenting display unit. Alternatively, or additionally, there is automatic linking by using additional position data which are provided by a position measuring device, e.g. an IMU, GPS receiver and/or video tracker, of the measuring device. As a further option, there subsequently is a visual display of the linked scan data records on a display, e.g. a view of the entire surroundings represented by both or all scan data records. By way of example, this display serves for the visual control of the approximate alignment in order to be able to determine possible errors.

The external data processing device is embodied as e.g. a portable device, for example as a field computer, tablet or smartphone, with the portable device being in situ when carrying out the method. In this case, the data transmission between the measuring device and the external device is optionally effectuated by means of Wi-Fi, WLAN and/or Bluetooth. Alternatively, or additionally, the external device is embodied as an office computer, i.e. a computer for stationary use, which is spatially separate from the measuring device. In this case, the data transmission between the measuring device and the office computer is optionally effectuated by virtue of a field computer, tablet or smartphone being interposed as a (data) relay station. Independently of the type of the external data processing device, control signals are transmitted from the external data processing device to the measuring device as an option, wherein there can also be complete remote control of the measuring device by the external data processing device.

Optionally, the display of the individual scans is effectuated as a panorama view, preferably as a cube view, which facilitates an all-round view of the scan. As a further option, the display is effectuated by means of an image map that is linked to the reduced scan data record, preferably a cube map, with a number of map points that depends on a predetermined display resolution. Optionally, the image map is produced by virtue of mapping of selected individual scan data points to a map point being carried out by means of an assignment prescription, wherein the reduced number of individual scan data points corresponds to the number of map points. In a specific advantageous development, the assignment is effectuated directly on the basis of respective scan directions that are linked to the respective individual scan data points, facilitating a simple, fast and direct production of the image map. Further, the assignment is optionally embodied as a lookup table, in which the respective individual scan data points are recallable directly for the respective map points, allowing a particularly direct and fast data access.

In addition to the reduced scan data record, additional scan data related image information is created by the measuring device and transmitted to the external data processing device in a development of the method. By way of example, the scan data related image information is an image map which is created on the basis of a recorded or reduced scan data record and which serves for the visualization of the scan, for example by an arrangement of map points with an assigned brightness or color value. The advantage of the pure image information in relation to a scan data record is the comparatively small data volume thereof, permitting a fast data transmission. By way of example, this procedure can advantageously be used to create an image of the recorded scan data record using the image information, said image facilitating a visual representation with a higher display resolution than that of the transmitted reduced scan data record, with the pure image information—since, of course, no actual scan data are transmitted—only allowing a visualization but no scan data evaluation or scan data processing of scan data (apart from, naturally, a "visual" evaluation of the image, for example for checking for scan gaps). As a result of this, the user of the external device can e.g. switch between the two ways of representation—with a higher resolution but not evaluable and with a low resolution and evaluable. Alternatively, there is a combined display of the image information and the reduced scan data record such that e.g. most pixels are displayed depending on the pure image information and, arranged distributed between these pixels, there are pixels which are displayed dependent on the reduced scan data record and by means of which, in contrast to the remaining pixels, scan data, e.g. distance values, really are recallable. Optionally, there is instantaneous transmission of individual scan data points which are linked to an image information item, e.g. an image map point, upon demand by the external device (or the user thereof). By way of example, if the user wishes to know the 3D coordinates of a displayed point, the user marks said point, as a result of which a targeted request of scan data belonging to the point is transmitted to the measuring device, whereupon these scan data are transmitted to the external device.

In a further variant of the method, systematic device faults of the measuring device are taken into account when selecting individual scan data points such that the reduced scan data record is device fault corrected, preferably largely device fault free. By way of example, the device faults are axis errors and/or those which relate to angle measurements for determining the measurement directions. Here, optionally, the systematic device faults are determined individually for the measuring device by means of a calibration process in the form of calibration parameters and the device faults are taken into account during the selection of the individual scan data points on the basis of the calibration parameters.

In a further development, quality criteria are taken into account when selecting individual scan data points such that individual scan data points with a comparatively high quality, e.g. individual scan data points with measurement values having a comparatively good signal-to-noise ratio, are preferably selected. This advantageously avoids the case where particularly high quality scan data are not transmitted. The taking into account optionally comprises the scan region being subdivided into a number of portions, wherein the number of portions corresponds to the reduced number of individual scan data points, and respectively those individual scan data points which, within respective portions, have the highest quality in comparison with the further individual scan data points of the respective portions being selected.

Alternatively, or additionally, an information content of the respective individual scan data points is taken into account when selecting the individual scan data points, for example by virtue of individual scan data points with a high information content, e.g. above a defined information content threshold, being adopted in the reduced scan data record in any case and/or by virtue of making a distinction between regions in respect of the information content of the individual scan data points in the respective region and selecting individual scan data points in such a way that the reduced scan data density in regions with a high information content is comparatively high, for example, devoid of any change, the same as the first scan data density, and comparatively low in regions with a low information content. What is avoided as a result of this is the non-inclusion in the reduced scan data record of scan data which mean a substantial increase in information about the object surfaces, as may be the case e.g. in the case of a "stubborn" counting selection (the respective third individual scan data points are selected).

As a further development of the method according to the invention, the individual scan data points are selected in a smoothing manner such that an irregular distribution of the points on the object surface is corrected. Thus, while e.g. the recorded scan data record, as the case may be, yields very different point densities (e.g. with unnecessarily high point densities of surfaces which have little structuring or little relevance per se), the reduced scan data record then has a scan data selection which yields a uniform or at least more equable point density. By way of example, this is attained by virtue of a distance between the points belonging to the respective individual scan data points being taken into account within the scope of the selection of the individual scan data points.

Furthermore, some embodiments of the present invention contain a computer program product which is stored on a machine readable medium, or a computer data signal, embodied by an electromagnetic wave, comprising program code for controlling or carrying out the method according to the invention.

Moreover, some embodiments of the present invention relate to a measuring system with a scan functionality and a data processing device that is external to the measuring device, in particular comprising a measuring device that is embodied as a laser scanner or total station. According to the invention, the measuring system is embodied to carry out the method according to the invention, for example by way of an appropriate control and evaluation unit of the measuring device, which carries out or controls the recording, creating and transmitting steps, and a data processing device, which is embodied for transmitting (receiving) the scan data and the visualization thereof.

The method according to some of the embodiments of the invention invention and the apparatus according to some of the embodiments of the invention are described in more detail below on the basis of the embodiments and application procedures that are schematically presented in the drawings.

DETAILED DESCRIPTION

Figure 1:
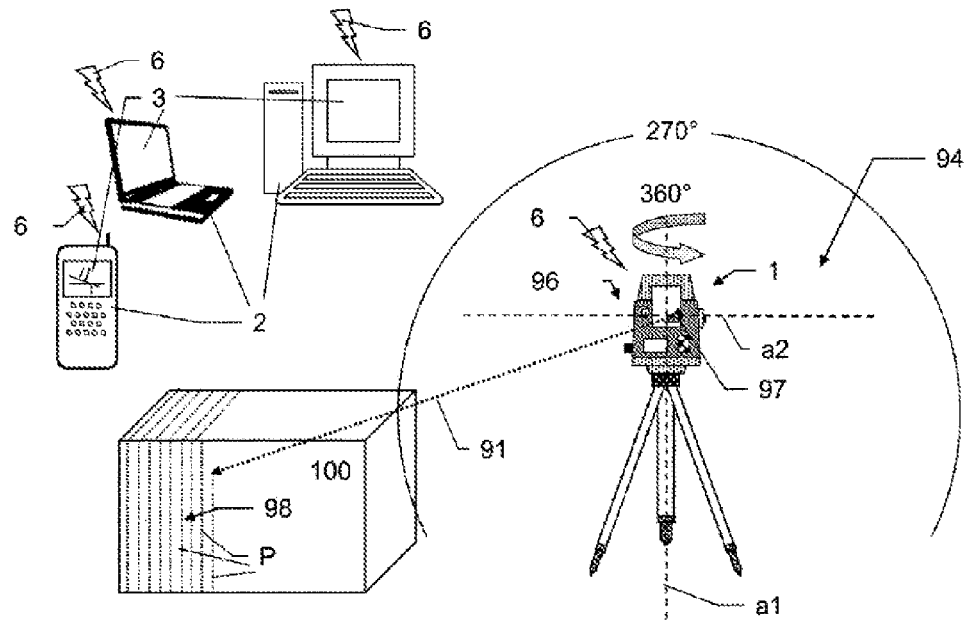
FIG. 1 shows a measuring system.

FIG. 1 shows a stationary measuring device 1 with a scan functionality, e.g. embodied as a laser scanner, for recording object surfaces 100. Here, the device 1 is embodied to emit measurement radiation 91 in accordance with a specific measurement direction, receive measurement radiation 91 that is reflected by the surface 100 and evaluate the latter, e.g. by means of a time-of-flight or phase difference method. For the purposes of scanning sensing of an object surface 100, the measurement radiation 91 is continuously swept and at least one measurement value is successively recorded in each case after short time intervals, this including a distance to the respective object point P in any case, and so a multiplicity of measurement directions are present, which are each measured by way of e.g. angle sensors, wherein a point is measured in each case for a measurement direction and hence a multiplicity of points 98 of the object surface 100 are measured. As a consequence, a multiplicity of individual scan data points are available in accordance with the multiplicity of points 98 or individual measurement processes, said individual scan data points being linked to one another and forming a first scan data record. In addition to the 3D coordinates of the points 98, or the distance and direction measurement values, the first scan data record, in this case, may comprise further data, e.g. intensity or brightness of the measurement radiation, a noise dimension, data relating to the measurement accuracy or the data density, or color information, which are ascertained by means of a camera (not depicted here) of the measuring device 1.

The measuring device 1 is embodied to effectuate a transmission 6 of (scan) data to an external data processing device 2, e.g. a portable device, such as a smartphone, field controller, tablet, or a desktop computer. The data processing device 2 comprises a display 3 which can represent data with a specific display resolution and, in so doing, the data processing device is situated either in situ, i.e. in the vicinity of the measuring device 1, or at a distance therefrom, e.g. in an office. As illustrated, the transmission is preferably wireless in this case. The type of the wireless transfer is also selected depending on whether the measuring device is situated in situ or has a great spatial separation from the point of the scanning; by way of example, transmission is carried out by Bluetooth or WLAN in the vicinity and by means of a radio connection or mobile radio network in the far region. For the purposes of the transmission 6 in the far region, e.g. to an office computer, a further external device with data transmission functionality is optionally interposed. By way of example, a tablet or smartphone that is situated in situ operates as a relay station by virtue of receiving the reduced scan data record from the measuring device, e.g. by Bluetooth, and forwarding said scan data, e.g. via a mobile radio network, to the office computer. Preferably, the link between the measuring device 1 and the data processing device 2 is two-way such that data are also transmittable e.g. from the field computer 2 to the measuring device 1 and also that, for example, the measuring device 1 is remotely controllable by means of the field computer 2.

For scanning purposes, there is the aforementioned sweeping as illustrated, for example by virtue of an upper part 96 of the measuring device 1 being rotated step-by-step or continuously in a relatively slow fashion about a first, vertical axis a1 in relation to a base such that the measurement radiation 91 is swept in the horizontal direction and by virtue of a swivelable optical component 97, e.g. a swivel mirror, being rotated in a relatively quick fashion about a horizontal axis a2 such that the measurement radiation 91 is swept in the vertical direction. As a result, the object surface 100 is scanned e.g. in a grid as illustrated, with a predetermined point density or scan resolution 98. Here, scanning is effectuated within a predetermined scan region 94, the boundaries of which are determined by the horizontal and vertical swiveling width. As a consequence, a first number of individual scan data points and, in relation to the scan region, a first scan data density, which represents a measure for how closely meshed the scan region is scanned, emerge depending on the selected or predetermined scan resolution. The higher the scan data density for a defined scan region, the more voluminous the scan data record and the greater the data volume.

Preferably, in this case, the scan region 94 is 360°, i.e. a complete revolution about the vertical axis a1, in the horizontal direction and e.g. 270° in the vertical direction such that a spherical scan region 94 is present, the latter imaging almost the entire surrounding region in all spatial directions. However, any other scan region 94 is also possible.

Figure 2:
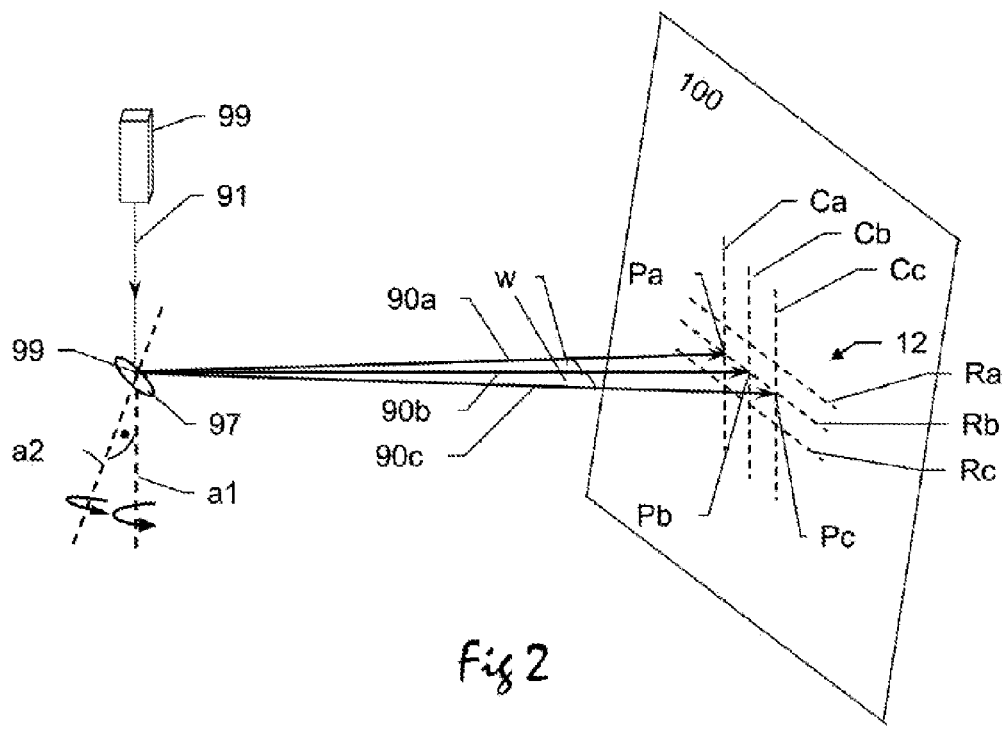
FIG. 2 shows a section of the measuring device and the recorded object surface.

FIG. 2 shows a section of the measuring device and the object surface 100. Measurement radiation 91 is emitted by a measuring unit 99, which comprises a measurement radiation source, e.g. a laser diode or an SLED, and a measurement radiation detector, and guided to the object surface 100 by means of an optical deflection element 97 which, in this example, is rotatable about two mutually orthogonal axes a1 and a2. The measurement radiation 91 is swiveled over the object surface 100 by a targeted movement of the deflection optical unit 97. Measurement directions 90a, 90b, 90c, which emanate from the same measurement reference point 99 and which, at least ideally, have the same angular distance from one another (the horizontal angular distance w is plotted in this example), are determined by the capture of individual scan data points by the measuring unit 99 with equal steps. Thus, at least one measurement value is captured for a respective measurement direction 90a-c in each case and linked to the respective measurement direction 90a-c and the individual scan data points are respectively related to an object point Pa-Pc. The individual scan data points in this case respectively contain at least as one measurement value a distance measurement value to a point Pa, Pb, Pc of the object surface 100 in any case, said distance measurement value being determined by evaluating reflected measurement radiation 91 that is detected by the measurement radiation detector. By respectively linking distance with a scan direction 90a-90c, in relation to the common measurement reference point 99, to a multiplicity of points, a 3D point cloud that represents the object surface 100 is generable from the scan data record.

By recording individual measurement data uniformly and with equal steps in the ideal case, a regular grid 12 is formed by the measurement directions 90a-c, rows Ra, Rb, Rc and columns Ca, Cb, Cc being assigned to said grid. Accordingly, the individual scan data points are organized in a matrix, i.e. managed in a table with a column and row index. The more closely meshed the grid 12 with which the object surface 100 is sensed in this case, the higher the first scan data density.

Figure 3:
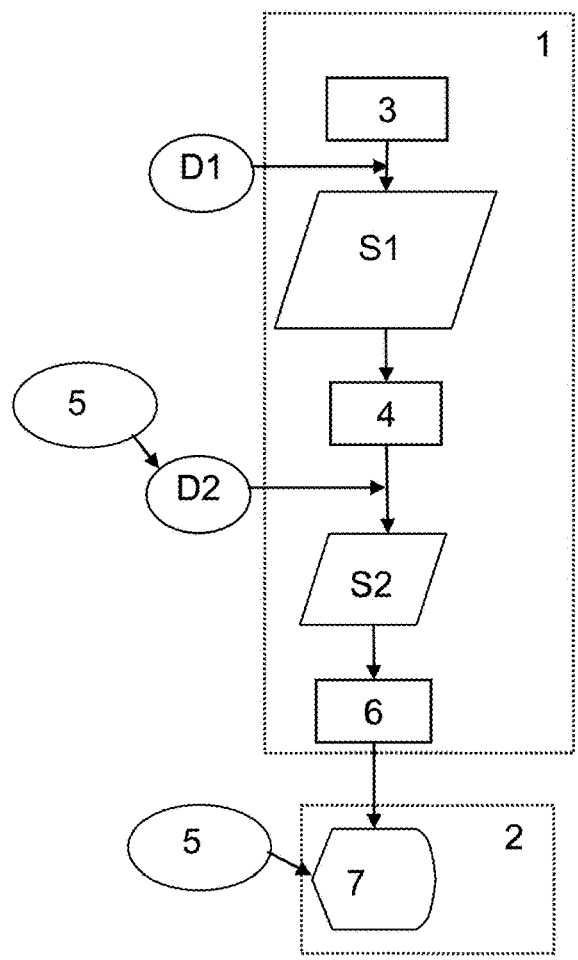
FIG. 3 schematically shows a principle of the method according to the invention.

FIG. 3 schematically shows the procedure of the method according to the invention. With the measuring device 1 there is a recording 3 of the object surfaces within the scan region, as a result of which the first, recorded scan data record S1 emerges, the latter having a first number of individual scan data points with a first scan data density D1. Subsequently (or else already during the scan 2), there is a creation 4 of a reduced scan data record S2 by selecting individual scan data points of the first scan data record S1. Here, the selection is effectuated in such a way that the second, reduced scan data record S2 has a second number of individual scan data points with a scan data density D2 which is less than the first scan data density D1 and which depends on a display resolution 5. The display resolution 5 is a resolution with which the scan data record S2 is intended to be, or can be, represented visually. Subsequently (or already during the creation 4), there is a transmission 6 of the reduced scan data record S2 to the external data processing device 2. Subsequently (or already during the transmission 6), there is a visual display 7 of the reduced scan data record S2 (or of parts thereof) on the display of the data processing device 2, with the display 7 being effectuated with the display resolution 5 (or with a display resolution, e.g. a lower display resolution, that is derived therefrom). Thus, preferably, the creation 4, the transmission 6 and the display 7 are effectuated in a timely manner in relation to the scanning.

By selecting individual scan data points of the recorded scan data record S1, i.e. as a result of the fact that only some of the individual scan data points are adopted, the cardinality of the reduced scan data record S2, and hence its data volume, is reduced in comparison with the recorded scan data record S1. By way of example, if there is an adoption of only half or a tenth of the individual scan data points, this yields a data volume which is only approximately a half or a tenth of the original. What portion of the individual scan data points is adopted in the process depends on, according to the invention, the predetermined display resolution 5. The higher the latter, i.e. the greater the number of pixels to be represented, the greater also the second number of individual scan data points (wherein the latter is smaller than the first number of individual scan data points in any case) and the reduced scan data density D2. Here, it is not mandatory for the scan data densities S1, S2 to be ascertained as explicit values or to be predetermined. Rather, these are implicitly present in any case as a property of the respective scan data records S1, S2, or the reduced scan data density S2 emerges implicitly from the predetermined display resolution 5 (and hence a number of pixels) and the predetermined scan region (and hence the scan volume).

Since the intended display resolution 5, with which the scan data should be displayed 7, serves as a guideline for the thinning of the recorded scan data record S2, there is no deterioration in the visual representation of the scan data record as a result of the method according to the invention in any case. In view of the visualization of the scan with the desired resolution, the individual scan data points that are not adopted into the reduced are, as it were, unnecessary data volume as the recorded scan data record has a first scan data density S1 which is not representable with this detail on the display of the data processing device 2 in any case. Hence, the method according to the invention anticipates a loss of detail which, as it were, is generally carried out anyway in relation to the scan data representation. In contrast to the prior art, the loss of detail is not only effectuated within the process of displaying by the external display device 2 but already within the measuring device prior to the transmission 6 to the display device 2, and so the data volume that is not necessary in respect of displaying 7 need not even be transferred, which advantageously saves time at a given data transfer rate or facilitates a lower data transfer rate without having to accept an increased time outlay.

Figure 4:
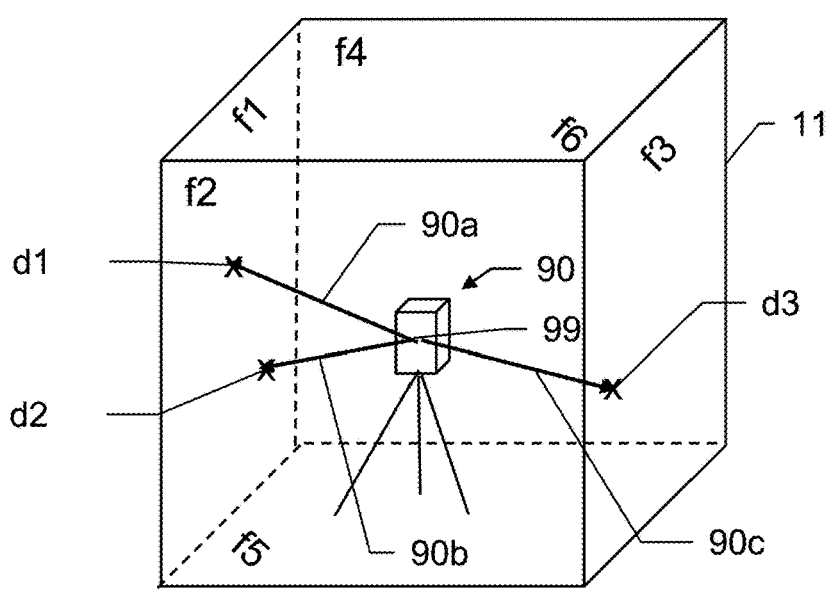
FIG. 4 shows a schematic example for a form of the visual display.

FIG. 4 shows a schematic example for a form of the visual display of the reduced scan data record. The representation is carried out by means of an image map 11 embodied as a cube map as a cube representation. Here, the center of the cube is identical to the measurement reference point 99, and so the measuring device 1 can be considered as standing in the center of the cube. Here, the cube map 11 has a number of map points (pixels), of which three points d1, d2 and d3 are illustrated in an exemplary manner, said three points being situated on three different sides of the six cube sides f1-f6. Here, the number of points d1-d3 of an image map 11 depends on the predetermined display resolution which, in turn, may be dependent on the intended display unit. That is to say, the greater the display resolution, the greater the number of points of the cube map 11 and the higher the display point density per cube surface f1-f6.

Selection of individual scan data points from the recorded scan data record is now carried out in such a way that the reduced number of individual scan data points equals the map point number. Here, the selection of the individual scan data points or an assignment of individual scan data points to be represented to map points is carried out e.g. directly on the basis of the measurement direction. This is presented in an exemplary manner on the basis of the three map points d1-d3: the measurement direction 90a is assigned to the point d1, the measurement direction 90b is assigned to the point d2, and the measurement direction 90c is assigned to the point d3. Thus, the selection is carried out on the basis of the measurement direction 90a-c, which corresponds to the respective map point. Individual scan data points that belong to measurement directions that are not used because no corresponding map point d1-d3 is present are not selected, i.e. not adopted in the reduced scan data record. Thus, the individual scan data points—image map points assignment is carried out in this example without taking into account the distance to the respective object surface point Pa-Pc (cf. FIG. 2) which is linked to the respective measurement direction 90a-90c and independent of the measurement values or point coordinates that are linked to the measurement directions 90a-c. The measurement value or values linked to a respective measurement direction 90a-c themselves are not incorporated in the production of an image map 11 but are assigned to a respective map point d1-d3 on account of the assignment. If the individual scan data points each have more than one relevant displayable measurement value, e.g. a noise dimension or the intensity of the received measurement radiation in addition to the distance measurement value, these are handled as a separate image map layer. The external orientation of the camera pixels in relation to the laser is known. Therefore, the 3D points can be complemented with color information items. These are also available as a dedicated layer and can be displayed. The cube map 11 created by means of the method according to the invention allows a distortion-free representation.

Optionally, a further image map is produced proceeding from the recorded scan data record or a further scan data record derived therefrom, and said further image map is additionally transmitted to the external device in addition to the reduced scan data record. This further image map has a higher resolution than the image map linked to the reduced scan data record and therefore permits a representation with a higher resolution than the predetermined resolution. However, only pure image information is additionally transferred with this further image map, and no additional individual scan data points, which is why there can be no scan data related evaluation or processing by the external device on the basis of this image map. It is advantageous that the data size of the pure image information is comparatively small, i.e. it facilitates a fast data transmission. Using this additional image information, a user can e.g. obtain a visual impression with a higher resolution in addition to the visual display of the reduced scan data record on a display of the external device.

Figure 5:
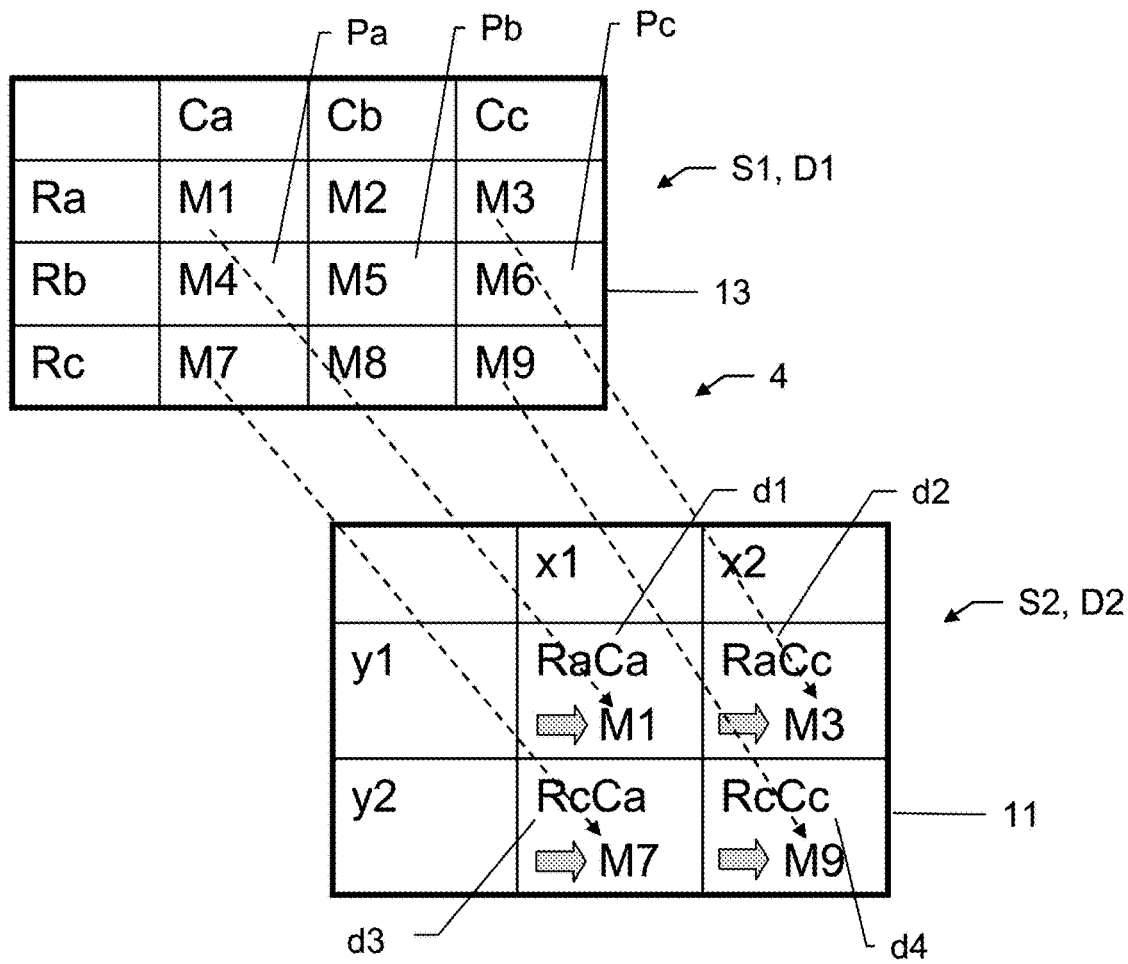
FIG. 5 shows a creation of a reduced scan data record, FIGS. 6a-c schematically show a further development of the method according to the invention, FIG. 7 schematically shows a further development of the method according to the invention, FIG. 8 schematically shows a further development of the method according to the invention, and FIG. 9 schematically shows a further development of the method according to the invention.

FIG. 5 illustrates a creation of a reduced scan data record in the case of a selection by means of a matrix or table. FIG. 5 shows, firstly, a recorded scan data record S1 that is embodied as a matrix 13 with rows Ra-Rc and columns Ca-Cc, in which the individual scan data points are organized in accordance with the scan grid (cf. FIG. 2). In the matrix 4, there are the individual scan data points M1-M9 which belong to the respective object points (measurement points Pa-Pc are marked in excerpts, cf. FIG. 2). FIG. 5 shows a further image map 11 in the form of a table, which organizes the map points d1-d4 in the form of rows and columns (each field represents a map point). Table 11 has fewer fields than the matrix 4 and the second scan data density that is dependent on the display resolution (expressed as the scope of the table 11) is less than the first scan data density (scope of the matrix 13). An individual scan data point M1-M9 is assigned to each indexed display point d1-d4 on the basis of the table 11, wherein, however, not all individual scan data points M1-M9 are linked to a map point d1-d4 and instead this is carried out in a selective manner; in the example, the individual scan data points M1-M9 of each second column and row are selected. Thus, for example, the scan data point M1 is assigned to the point d1 with the index x1y1 and the scan data point M3 is assigned to the point d2 with the index x2y1. Thus, a reduced scan data record S2 is created 4 in the example by the uniform assignment of individual scan data points M1-M9 to image map points d1-d4 and the image map 11 represents the reduced scan data record S2. Thus, the reduced scan data record S2 comprises the individual scan data points M1, M3, M7, and M9, which are selected on the basis of the image map 11, the latter predetermining the reduced scan data density such that the reduced scan data density is therefore selected depending on the display resolution. If the scan region in the recorded scan data record S1 is described by nine individual scan data points M1-M9, the same scan region in the reduced scan data record S2 is only still described by four individual scan data points M1, M3, M7, and M9, and so there is a drastic reduction in the data. However, there is no impairment of the visual impression when displaying the scan since the latter is only displayed with this resolution in any case.

Figure 6A:
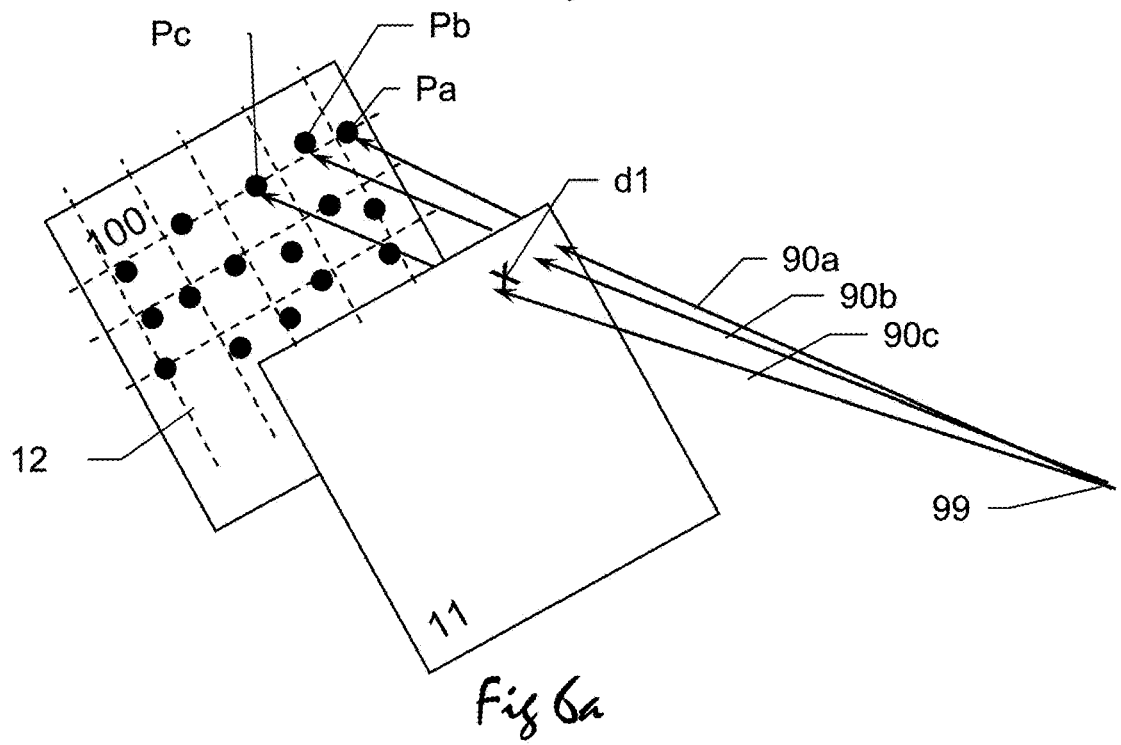
Figure 6B:
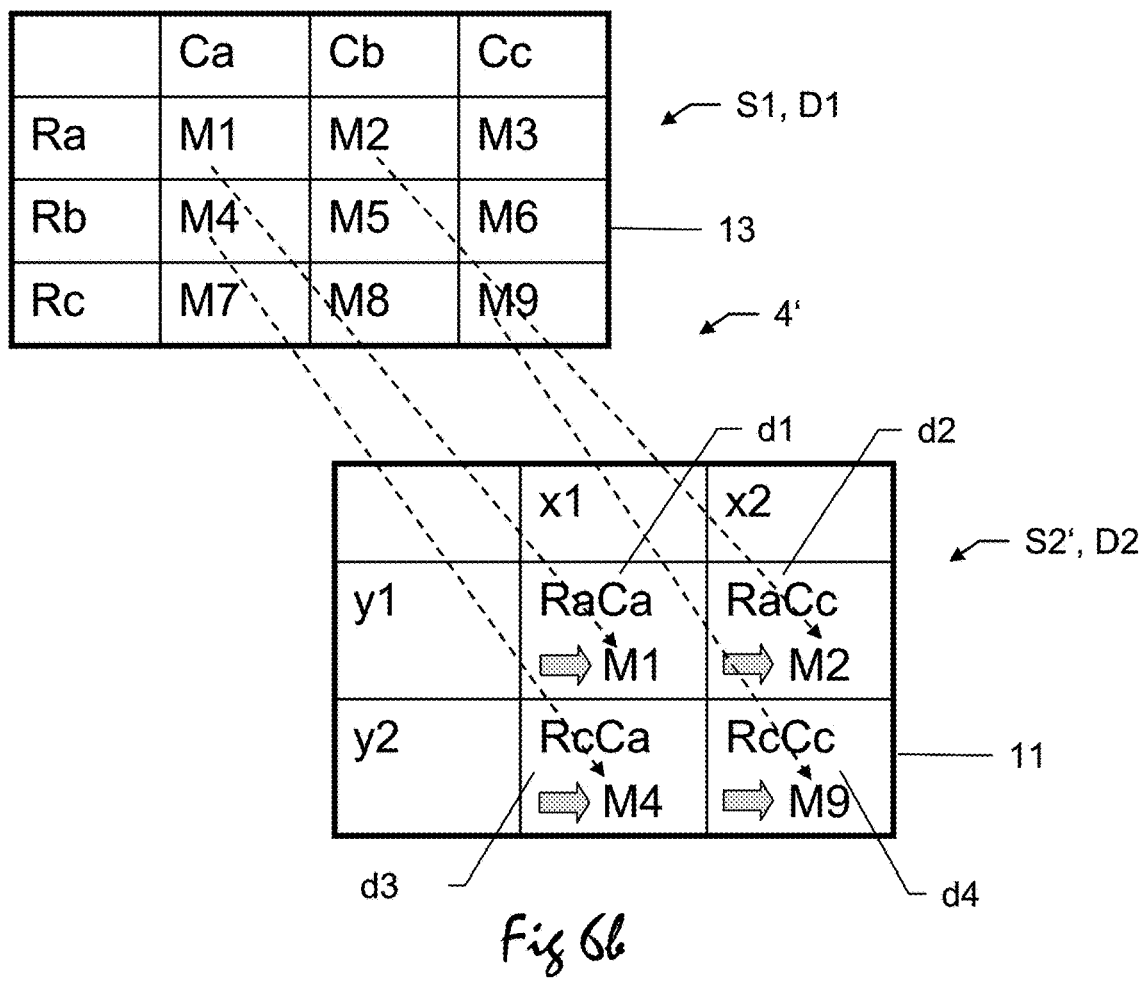
Figure 6C:
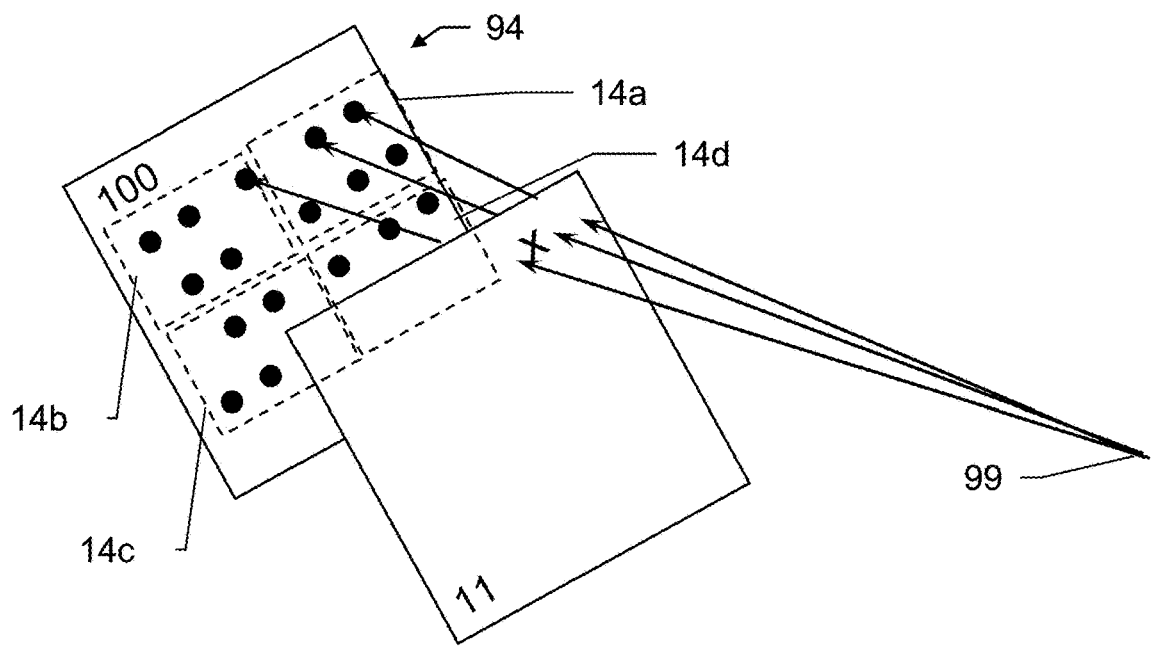

FIGS. 6a, 6b, and 6c graphically show a further development of the method according to the invention, wherein, like in FIG. 5, the form of a matrix 13 and a table 11 is selected again in a purely exemplary manner. Like in the example according to FIG. 5, there is a creation of a reduced scan data record S2' with a reduced scan data density D2 from the recorded scan data record S1 with the first scan data density D2. The reduced scan data density D2 is the same as in the previous example, i.e. the number of selected individual scan data points is the same; however, in contrast to the example according to FIG. 5, the selection is not simply uniform but on the basis of additional criteria, and so it is not the individual scan data points M1, M3, M7, and M9 that are selected (cf. FIG. 5), but M1, M2, M4, and M9.

A criterion for this type of selection of individual scan data points is that systematic, i.e. reproducible, device faults are taken into account within the scope of the method. Such errors of a measuring device with a scan functionality are predominantly axis errors or else errors caused by latency times in the synchronization between the angle measurement (for determining measurement directions) and distance measurement. On account of the reproducibility, these are when creating the reduced scan data record (and in the example of producing the image map), and so the selection of the individual scan data points (and hence the representation of the scan data) is already carried out in a measurement error corrected manner as a result thereof. Preferably, this is used to compensate device faults that relate to angle measurements, by means of which the measurement directions are determined. Here, the device faults are optionally determined individually for the measuring device by a calibration process and taken into account during the selection on the basis of the calibration parameters that are ascertained as a result thereof. In this case, the device faults can be substantially represented by the following calibration parameters: vertical axis skew, index error (angle offset) of the vertical angle sensor, collimation error of the target line and tilt axis skew. The calibration process and the consideration of the calibration parameters when creating the reduced scan data record or selecting the individual scan data points is carried out in the factory in this case, prior to delivery of the measuring device. Additionally, there optionally is a (re-) calibration and an update of the calibration parameters by the user, e.g. prior to each scan process.

The selection illustrated in FIG. 6b is still based on the thinning principle of FIG. 5 (selection of only every second row and column), but, in contrast to FIG. 5, it is refined by virtue of there being a device fault compensation which, on account of taking into account the known measurement errors, in fact selects the individual scan data points that fit best to the display points d1-d4.

Since the scan data are available in rows and lines, there is also a lookup table of the same size, in which the location of this measurement point in the reduced amount of data is noted. In the selection illustrated in FIG. 6b, CaRb points to x1y2.

FIG. 6a illustrates how the actually obtained distribution of the measurement directions 90a-90c and, as a result thereof, the distribution of the object points Pa-Pc deviate from the ideal regular grid 12 (cf. FIG. 2 as well) on account of a device fault, e.g. an axis error. Therefore, in this case, it is not the measurement direction 90b that is closest to the map point d1, as in the ideal case according to FIG. 2, but instead the measurement direction 90c. Therefore, the individual scan data point, which belongs to the object point Pc, is selected for the map point d1 (and not the individual scan data point belonging to the object point Pb, as would be the case without a device fault). Thus, the individual scan data point that belongs to the point Pc or the measurement direction 90c is assigned to the map point d1 and the latter is selected.

This type of selection is illustrated in FIG. 6b. It is possible to see that, for example, it is not the individual scan data point M3 that is assigned to the map point d2, and hence selected, as would be the case without device faults, but instead the individual scan data point M2, and the individual scan data point M4 is assigned to the map point d3, and hence selected, instead of the individual scan data point M7. Hence, the reduced scan data record S2' contains the individual scan data points M2 and M4 in place of the individual scan data points M3 and M7 with, in comparison with the example according to FIG. 5, an unchanged reduced scan data density D2.

In place of, or in addition to, a selection criterion which compensates device faults, a quality-based selection criterion is used. That is to say, those individual scan data points M1-M9 which have a particularly high quality are preferably selected when creating the reduced scan data record S2'. By way of example, high quality means that the respective individual scan data points have measurement values with a particularly good signal-to-noise ratio. Then, in the example according to FIG. 6b, the individual scan data points M2 and M4 are selected because they have a higher quality or a significantly higher quality than the individual scan data points M3 and M7. This procedure advantageously prevents particularly good scan data from being removed when creating the reduced scan data record S2' and not being adopted in the reduced scan data record S2', and represents an optimization of the scan quality. In the case of a first scan data density that is very much higher than the display resolution, the object point density is also very much higher than the map point density, and so the deviations between e.g. the object points Pc and Pc are practically negligible for a visual display. Therefore, such a selection on the basis of quality criteria is practically not connected with disadvantages—within certain boundaries—in respect of the representation and evaluation of the scan data on the basis of the representation.

FIG. 6c presents how such boundaries are observed by subdividing the scan region into a number of portions. In the example, the scan region 94 is subdivided into four portions 14a-14d. Here, the number of portions 14a-d corresponds to the number of individual scan data points to be selected, i.e. equals four in the example. The selection is now carried out by virtue of selecting those individual scan data points within a respective portion 14a-14d which have the highest quality in comparison with the remaining individual scan data points of said respective portion 14a-14d.

Figure 7:
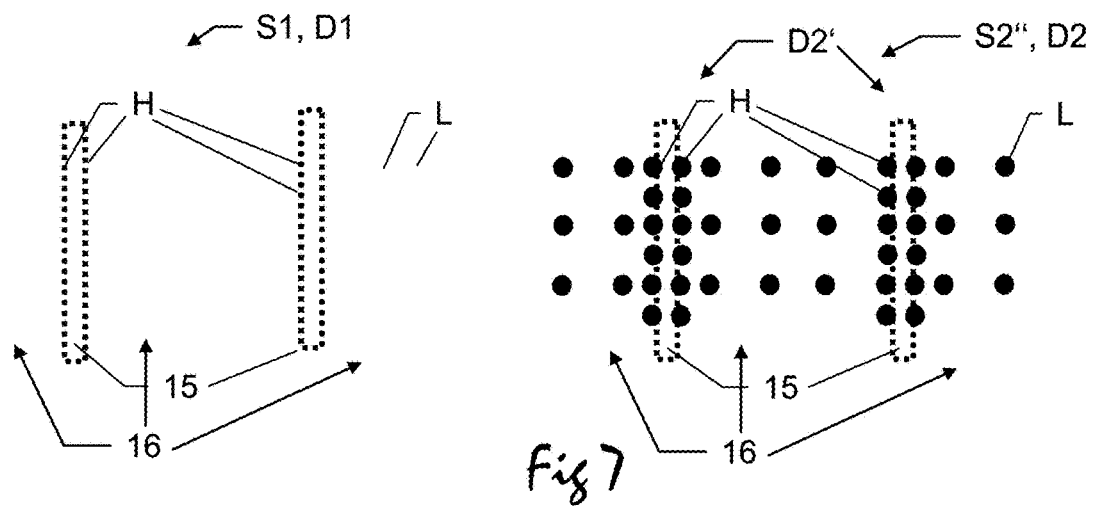

FIG. 7 shows a further development of the method according to the invention. This development is distinguished by a creation of the reduced scan data record S2", in which the information content of the individual scan data points H, L is taken into account when selecting the latter. FIG. 7 schematically shows the recorded scan data record S1 with the first scan data density D1 on the left-hand side, with the points respectively representing individual scan data points H, L. In the scan region there are two zones 15 which have individual scan data points H with a particularly high information content. By way of example, these zones 15 emerge from strongly structured surfaces or surface edges, i.e. portions of the scan region which represent transitions between zones 16 with an unchanging surface. While zones or surfaces 16 which remain unchanged can already be described and visualized with relatively few points or individual scan data points, more points or individual scan data points H are required for the correct description and visualization of transition zones 15. Expressed differently, the individual scan data points H of the zones 15 have a comparatively high information content, and so these individual scan data points H contribute a relatively large gain of surface information, whereas the individual scan data points L each only mean little gain since, for example, the object surface that they describe is already sufficiently well known from three such individual scan data points in the ideal case. The development according to FIG. 7 therefore constitutes an "intelligent" selection of individual scan data points H, L, which facilitates a reduction in the scan data amount and, in the process, keeps highly relevant information in any case.

Therefore, in this development of the invention, the respective information content of the individual scan data points H, L is ascertained, e.g. by an edge or feature point detection algorithm, and taken into account when selecting said individual scan data points. The taking into account is effectuated by virtue of individual scan data points H with a high information content being selected in any case and not being "rejected" during the selection, even if, for example, this results in an uneven distribution of the individual scan data points of the reduced scan data record. Here, a threshold for the information content is optionally defined, said threshold specifying the information content above which the corresponding individual scan data points H should be adopted in any case. Here, the reduced scan data record S2" is created in such a way that the reduced scan data density D2 assumes the value which it would also have without taking into account the information content (i.e., the overall number of individual scan data points of the reduced scan data record S2" remains unchanged, and so additional low value individual scan data points L are rejected for the individual scan data points H that are adopted on account of the high information content).

Alternatively, all high value individual scan data points H are additionally adopted—as depicted on the right in FIG. 7—such that a locally increased scan data density D2', which is higher than the scan data density of the remaining regions, emerges in the regions 15 of high information content. As a consequence, the reduced scan data record S2" has regions 15 with an increased scan data density D2'. The visual display of the reduced scan data record S2" then is optionally effectuated firstly with a display resolution which corresponds to the "global" scan data density D2, wherein the locally increased scan data density D2' allows higher resolution zooming into the highly structured regions 15.

Figure 8:
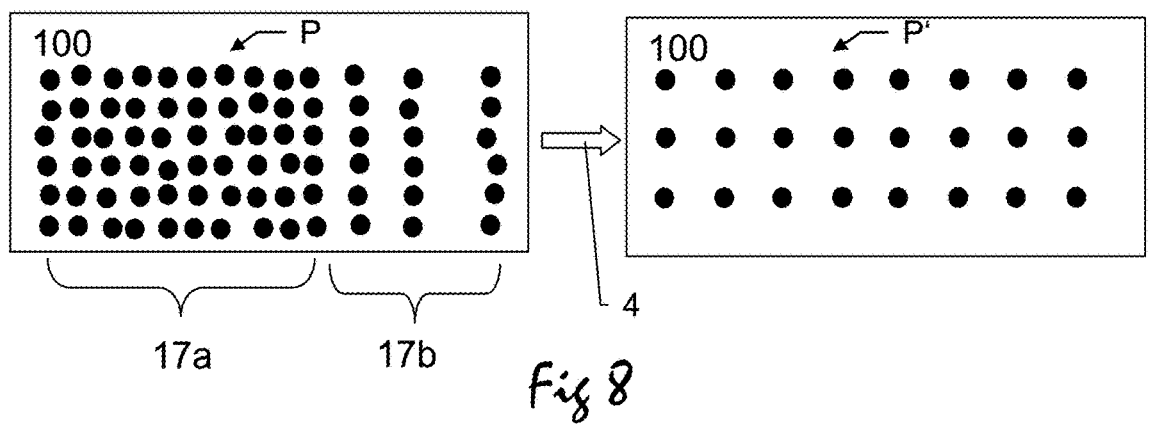

FIG. 8 shows a further development of the method according to the invention. In this development, the thinning of the recorded scan data record is used to correct an irregular distribution of the recorded object points P of the object surface 100. Irregular point distributions arise during scanning as a result of e.g. the aforementioned device faults, which bring about a deviation from the ideal grid (see point region 17a). Moreover, irregularities also arise independently of possible errors, for example also as a result of the fact that the distance of the object surfaces 100 from the measurement reference point differs. In the case of a uniform change in the measurement direction, the mutual spacing of the object points P is smaller in the case of close surfaces 100 than in the case of surfaces 100 that are situated further away from the measuring device (a uniform scan data density would only be obtained for spherical measurement surroundings). That is to say, the recorded point density is higher in the near region than in the far region (symbolized by the point region 17b). According to the invention, the creation 4 of the reduced scan data record in this development is effectuated in equalizing fashion by virtue of the selection of the individual scan data points being effectuated in such a way that the reduced scan data record S2" has a uniform distribution of the thinned points P' (as an alternative to complete uniformity and deviating from the illustration in FIG. 8, at least a more uniform distribution is effectuated). By way of example, the mutual spacing of the object points P or the distance measurement value, i.e. the distance of the respective recorded object point P from the measuring device, is taken into account when selecting the individual scan data points and the scan data density in the case of a high point density or the scan data density of points in the near region is reduced more strongly than in the case of a low point density or in the case of points in the far region. Optionally, there is smoothing of the point density region-by-region in the process, and so the reduced scan data record has regions with different and respectively uniform point densities.

Figure 9:
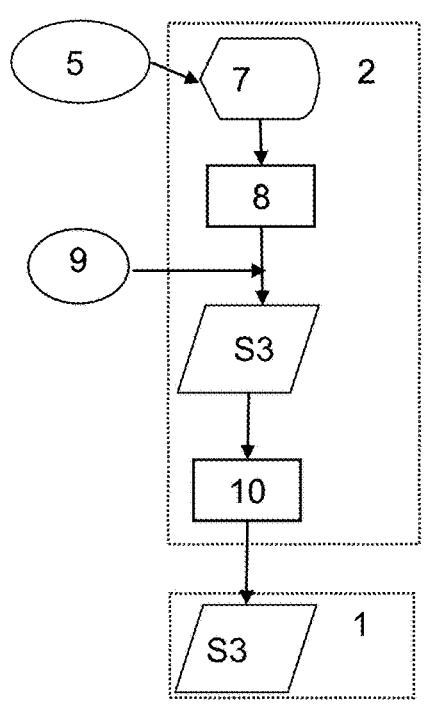

FIG. 9 shows a further development of the method according to the invention. Presented schematically is the display 7 of the reduced scan data record on the external data processing device 2 with the display resolution 5 (cf. FIG. 3). In the development, there now is processing 8 of the reduced scan data record, from which a processed scan data record S3 emerges. Here, the processing is effectuated automatically by a computing unit of the data processing device 2, e.g. by an automated evaluation, or manually by a user on the basis of the visual representation, preferably in a timely manner, i.e. still during the scan or immediately after the scan or very shortly thereafter. The processing or evaluation is effectuated in respect of e.g. a check of the scan data record in respect of errors or completeness and/or an evaluation of the scan data (e.g. ascertainment of point distances) and/or by the insertion of metadata, wherein the metadata are e.g. results of the evaluation (area calculations or distance calculations) or texts, images, CAD data or voice memos. Alternatively or additionally, the processing of the scan data comprises an ascertainment of regions of particular interest (regions of interest, ROI). Such regions are predominantly particularly relevant or structure-rich object surfaces. Then, there optionally is a timely additional recording of object surfaces of this ROI using the measuring device such that the first or second scan data record is complemented, wherein complementing is understood to mean not only an insertion of scan data into an available scan data record but also the creation of a completely new scan data record. Preferably, the further recording is effectuated in this case with a third, increased scan data density such that e.g. structure-rich surfaces (e.g. edges, corners, etc.) are present with an increased degree of detail in comparison with the original scan. Here, the third scan data density is specified e.g. by comparison with the first scan data density, which has also been transmitted as metadata and as part of the reduced scan data record. The quick and timely evaluation or processing of the scan data, as facilitated according to the invention, thus facilitates an improvement of the scan result in a timely manner and with substantially less outlay than the methods from the prior art, in particular by virtue of the measuring device or the user thereof still being in situ as a result of the fast but nevertheless sufficiently accurate processing or evaluation, and thus being able to carry out further complementing or correcting scans.

Optionally, there is a return transmission 10 of the processed scan data record S3 (complete or partial, e.g. only the components modified in comparison with the reduced scan data record) from the external data processing device to the measuring device 1 following the processing. In the measuring device, the processed scan data record S3 is used to complement or adapt the (recorded or reduced) scan data record stored there, with adapting also being understood to mean replacing. Hence, a scan data record S3 that has been processed by the data processing device is available in a memory of the measuring device 1. Since the method according to the invention is preferably effectuated in a timely manner following the scan or already during the scan, this therefore allows a user, who is still in the field with the measuring device 1, to obtain feedback and/or instructions in relation to the scan results still in situ. Hence, the scan results advantageously can be "immediately" completed, complemented or improved where necessary.

Processing and checking of the scan data may alternatively also occur at a different location, from where the feedback then originates.

Optionally, there is not only a transmission of a reduced scan data record S2 (cf. FIG. 3), but also a transmission of a plurality of reduced scan data records that are created according to the principle of FIG. 3, said scan data records having been recorded from a plurality of adjacent scan locations which have overlapping scan regions. Thus, these different scan data records have individual scan data points, some of which relate to different object surfaces in each case and some of which relate to the same object surfaces. Then, in this development, the processing 8 (also) comprises a linking of these "neighboring" reduced scan data records by virtue of these being roughly aligned (registered) to one another. Linking is either carried out manually by means of the visual representation 7, for example by virtue of the user marking displayed overlap regions or identical features or points on the display, or automatically by an appropriate algorithm that is available in the data processing device, wherein use is preferably made of additional position information items. By way of example, such additional position information items are ascertained by means of position sensors of the measuring device at the respective scan location, for example by means of GPS, IMU, video tracking and/or a compass. Preferably, there is a check by a user after the approximate alignment, for the purposes of which the result of the approximate alignment is displayed. If errors in the linking are determined manually or automatically, an appropriate information item is preferably transmitted to the measuring device, for example by virtue of one or more scan data records or parts thereof being return-transmitted, with defective or missing overlap regions being marked therein. Moreover, the reduced processed scan data records can be return-transmitted to the measuring device, e.g. as a single unified processed scan data record, and a check may optionally be carried out in situ by a user.

What is claimed is:

1. A method for processing scan data, the method comprising:
recording first scan data record over a defined object surface scan region by a measuring device, wherein the first scan data record comprises a first number of individual scan data points with a first scan data density and the individual scan data points are respectively related to a point on an object surface;
creating a reduced scan data record with a second, reduced number of individual scan data points making a selection from the first number of individual scan data points of the recorded scan data record using a control and evaluation unit of the measuring device, wherein the selection is carried out as an adaptation to a predetermined second, reduced scan data density, which is lower than the first scan data density, and the reduced scan data density is dependent on a predetermined display resolution and hence a pixel number for visually displaying scan data;
transmitting the reduced scan data record from the measuring device to an external data processing device; and
visually displaying the reduced scan data record or of parts thereof on a display of the external data processing device with the predetermined display resolution or with a display resolution derived therefrom,
whereby by the creation of a reduced scan data record, which creation is matched to the display resolution, it is those individual scan data points that are transmitted to the external device which are required for the visual representation with the desired display resolution,
wherein:
systematic device faults of the measuring device are taken into account at the same time when selecting individual scan data points such that the reduced scan data record is device fault corrected.

2. The method according to claim 1, wherein:
quality criteria are taken into account at the same time when selecting individual scan data points such that individual scan data points with a comparatively high quality are selected.

3. The method according to claim 1, further comprising:
processing the transmitted reduced scan data record by means of the external data processing device such that a processed scan data record emerges;
transmitting, in return, at least the processed parts of the processed scan data record to the measuring device; and
adapting of the recorded or reduced scan data record, which is kept available in a memory of the measuring device, on the basis of the return-transmitted processed scan data record or the return-transmitted parts thereof.

4. The method according to claim 1, further comprising:
transmitting at least two different scan data records with overlapping scan regions; and
linking of the scan data records by means of the data processing device.

5. The method according to claim 1, wherein the external data processing device is embodied as:
a portable device which is in situ when carrying out the method; or
an office computer which is spatially separate from the measuring device and a further external device interposed as a relay station between the measuring device and the office computer for the data transmission between the measuring device and the office computer.

6. The method according to claim 1, wherein the reduced number of individual scan data points:
    equals the number of pixels of the predetermined display resolution; or
    is at most one half of the first number.

7. The method according to claim 1, wherein the display is effectuated as a panorama view or is effectuated by means of an image map that is linked to the reduced scan data record, with a number of map points that depends on a predetermined display resolution, wherein the reduced number of individual scan data points corresponds to the number of map points.

8. The method according to claim 1, wherein an information content of the respective individual scan data points is taken into account at the same time when selecting the individual scan data points.

9. The method according to claim 1, wherein the creation of the reduced scan data record and the transmission thereof is effectuated after the recording.

10. The method according to claim 1, wherein the individual scan data points are selected in a smoothing manner such that an irregular distribution of the points on the object surface is corrected.

11. The method according to claim 1, wherein there is an evaluation of the scan data record on the basis of the transmitted reduced scan data record and by means of the external data processing device.

12. The method according to claim 1, wherein in addition to the reduced scan data record, additional scan data related image information, are created by the measuring device and transmitted to the external data processing device, wherein the scan data related image information serves for the visual display with a display resolution that is higher than the predetermined display resolution.

13. A computer program product storing instructions on a non-transitory machine readable medium comprising program code that in response to being executed cause carrying out the method according to claim 1.

14. A measuring system comprising:
    a measuring device with a scan functionality for recording first scan data record over a defined object surface scan region, wherein the first scan data record comprises a first number of individual scan data points with a first scan data density and the individual scan data points are respectively related to a point on an object surface; and
    a data processing device that is external to the measuring device;
    wherein the measuring system is configured to:
    create a reduced scan data record with a second, reduced number of individual scan data points making a selection from the first number of individual scan data points of the recorded scan data record using a control and evaluation unit of the measuring device,
    wherein the selection is carried out as an adaptation to a predetermined second, reduced scan data density, which is lower than the first scan data density, and the reduced scan data density is dependent on a predetermined display resolution and hence a pixel number for visually displaying scan data,
    transmit the reduced scan data record from the measuring device to an external data processing device, and
    visually display the reduced scan data record or of parts thereof on a display of the external data processing device with the predetermined display resolution or with a display resolution derived therefrom,
    whereby by the creation of a reduced scan data record, which creation is matched to the display resolution, it is those individual scan data points that are transmitted to the external device which are required for the visual representation with the desired display resolution,
    wherein:
        systematic device faults of the measuring device are taken into account at the same time when selecting individual scan data points such that the reduced scan data record is device fault corrected.

15. The measuring system according to claim 14, wherein:
    quality criteria are taken into account at the same time when selecting individual scan data points such that individual scan data points with a comparatively high quality are selected.

16. The measuring system according to claim 14, wherein:
    the measuring device is configured to create the reduced scan data record and transmit the reduced scan data record; and
    the data processing device is configured to visually display the reduced scan data record.

17. The measuring system according to claim 16, wherein the measuring device includes a control and evaluation unit configured to create the reduced scan data record and transmit the reduced scan data record.

* * * * *